(12) United States Patent
Takeda et al.

(10) Patent No.: US 9,970,072 B2
(45) Date of Patent: May 15, 2018

(54) HIGH-STRENGTH SPRING STEEL WIRE WITH EXCELLENT HYDROGEN EMBRITTLEMENT RESISTANCE, MANUFACTURING PROCESS THEREFOR, AND HIGH-STRENGTH SPRING

(71) Applicant: KOBE STEEL, LTD., Kobe-shi (JP)

(72) Inventors: Atsuhiko Takeda, Kobe (JP); Nao Yoshihara, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 152 days.

(21) Appl. No.: 14/439,864

(22) PCT Filed: Dec. 2, 2013

(86) PCT No.: PCT/JP2013/082380
§ 371 (c)(1),
(2) Date: Apr. 30, 2015

(87) PCT Pub. No.: WO2014/097872
PCT Pub. Date: Jun. 26, 2014

(65) Prior Publication Data
US 2015/0292052 A1    Oct. 15, 2015

(30) Foreign Application Priority Data
Dec. 21, 2012   (JP) .............................. 2012-279437

(51) Int. Cl.
| | | |
|---|---|---|
| *C22C 38/02* | (2006.01) | |
| *C22C 38/04* | (2006.01) | |
| *C21D 9/52* | (2006.01) | |
| *C21D 1/18* | (2006.01) | |
| *C21D 6/00* | (2006.01) | |
| *C21D 1/42* | (2006.01) | |
| *C21D 9/60* | (2006.01) | |
| *C22C 38/00* | (2006.01) | |
| *C22C 38/06* | (2006.01) | |
| *C22C 38/54* | (2006.01) | |
| *C22C 38/08* | (2006.01) | |
| *C22C 38/12* | (2006.01) | |
| *C22C 38/14* | (2006.01) | |
| *C22C 38/16* | (2006.01) | |
| *C22C 38/34* | (2006.01) | |
| *C21D 8/06* | (2006.01) | |
| *C21D 1/22* | (2006.01) | |
| *C21D 9/02* | (2006.01) | |
| *C22C 38/18* | (2006.01) | |
| *C22C 38/42* | (2006.01) | |
| *C22C 38/50* | (2006.01) | |
| *F16F 1/02* | (2006.01) | |

(52) U.S. Cl.
CPC ............. *C21D 1/42* (2013.01); *C21D 1/22* (2013.01); *C21D 6/001* (2013.01); *C21D 6/002* (2013.01); *C21D 6/004* (2013.01); *C21D 6/005* (2013.01); *C21D 6/008* (2013.01); *C21D 8/065* (2013.01); *C21D 9/02* (2013.01); *C21D 9/525* (2013.01); *C21D 9/60* (2013.01); *C22C 38/00* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/34* (2013.01); *C22C 38/42* (2013.01); *C22C 38/50* (2013.01); *C22C 38/54* (2013.01); *F16F 1/021* (2013.01); *C21D 2211/008* (2013.01); *Y02P 10/253* (2015.11)

(58) Field of Classification Search
CPC ........ C21D 8/06; C21D 8/065; C21D 9/0075; C21D 9/02; C21D 9/52; C21D 9/525; C21D 2211/008; F16F 1/02; F16F 1/021
See application file for complete search history.

(56) References Cited

U.S. PATENT DOCUMENTS

| | | | |
|---|---|---|---|
| 8,038,934 B2 * | 10/2011 | Kochi | ................ C22C 38/002 148/328 |
| 2003/0201036 A1 | 10/2003 | Hashimura et al. | |

(Continued)

FOREIGN PATENT DOCUMENTS

| | | |
|---|---|---|
| CN | 101365820 A | 2/2009 |
| JP | 2001-234277 A | 8/2001 |

(Continued)

OTHER PUBLICATIONS

Leica Metallurgy Application Briefing, "JIS G0551 Method of Austenite Grain Size Test for Steel," Leica Microsystems Imaging Solutions, 2000, pp. 56-58 (entire document is 134 pages).*

(Continued)

*Primary Examiner* — Scott Kastler
*Assistant Examiner* — Vanessa T Luk
(74) *Attorney, Agent, or Firm* — Oblon, McClelland, Maier & Neustadt, L.L.P.

(57) ABSTRACT

A high-strength spring steel wire is provided which secures excellent hydrogen embrittlement resistance even when the adding amount of alloy elements is suppressed, and has 80 area % or more of tempered martensite and 1,900 MPa or more of the tensile strength, in which a predetermined chemical composition is satisfied, with C and Si satisfying the relation of the expression (1) below, with prior austenite grain size number being No. 10 or more, and with the hydrogen absorption amount being 14.0 ppm or more.

$$0.73\% \leq [C]+[Si]/8 \leq 0.90\% \qquad (1)$$

where [C] and [Si] express the content (mass %) of C and Si respectively.

12 Claims, No Drawings

(56) References Cited

U.S. PATENT DOCUMENTS

| | | |
|---|---|---|
| 2006/0225819 A1 | 10/2006 | Yoshihara |
| 2007/0125456 A1 | 6/2007 | Kochi et al. |
| 2008/0279714 A1 | 11/2008 | Hashimura et al. |
| 2010/0224287 A1 | 9/2010 | Kochi et al. |
| 2011/0074076 A1 | 3/2011 | Kuno et al. |
| 2011/0074077 A1 | 3/2011 | Kuno et al. |
| 2011/0074078 A1 | 3/2011 | Nakano et al. |
| 2011/0074079 A1 | 3/2011 | Nakano et al. |
| 2013/0048158 A1 | 2/2013 | Honjo et al. |

FOREIGN PATENT DOCUMENTS

| | | |
|---|---|---|
| JP | 2001-288530 A | 10/2001 |
| JP | 2002-97543 A | 4/2002 |
| JP | 2002-180198 A | 6/2002 |
| JP | 2002-212665 A | 7/2002 |
| JP | 2004-143482 A | 5/2004 |
| JP | 2006-183137 A | 7/2006 |
| JP | 2006-291291 A | 10/2006 |
| JP | 2007-154240 A | 6/2007 |
| JP | 2007-191776 A | 8/2007 |
| JP | 2009-256771 A | 11/2009 |
| JP | 2011-74431 A | 4/2011 |
| JP | 2011-246811 A | 12/2011 |
| JP | 2012-144752 A | 8/2012 |
| KR | 10-2007-0005013 A | 1/2007 |
| WO | WO 2007/083808 A1 | 7/2007 |
| WO | 2013/179934 A1 | 12/2013 |

OTHER PUBLICATIONS

R. E. Napolitano, "Measurement of ASTM Grain Size Number," ASTM E 112 Table, five (5) pages total, publication date unknown.*
International Search Report with Written Opinion dated Feb. 25, 2014 in PCT/JP2013/082380 filed Dec. 2, 2013.

* cited by examiner

HIGH-STRENGTH SPRING STEEL WIRE WITH EXCELLENT HYDROGEN EMBRITTLEMENT RESISTANCE, MANUFACTURING PROCESS THEREFOR, AND HIGH-STRENGTH SPRING

TECHNICAL FIELD

The present invention relates to a high-strength spring steel wire with excellent hydrogen embrittlement resistance (hydrogen embrittlement resistant performance), a manufacturing process therefor, and a high-strength spring. More specifically, the present invention relates to a spring steel wire which is useful as a raw material for a coil spring used in a heat treated (quenched and tempered) state and is excellent in hydrogen embrittlement resistance even though it has high strength of 1,900 MPa or more of the tensile strength, a manufacturing process therefor, and a high-strength spring.

BACKGROUND ART

With respect to a coil spring (for example a valve spring, suspension spring and the like used for an engine, suspension and the like) used for an automobile and the like, in order to reduce exhaust gas and to improve fuel economy, reduction of the weight has been required and high strengthening has been demanded. Because a high-strengthened spring is liable to cause hydrogen embrittlement, the spring steel wire used for manufacturing the spring is required to be excellent in hydrogen embrittlement resistance.

As a method for improving the hydrogen embrittlement resistance of a high-strength spring steel wire, it is known to control the chemical composition and microstructure and so on. However, according to these methods, a large amount of alloy elements is used which is not necessarily desirable from the viewpoints of the manufacturing cost and resources saving.

Also, as a method for manufacturing a spring, a method of heating a steel wire to a quenching temperature, hot-forming the same into a spring-shape, and thereafter tempering the same by cooling in oil and a method of quenching and tempering a steel wire and thereafter cold-forming into a spring-shape are known. Further, in the cold-forming method of the latter, it is also known to perform the quenching and tempering before forming by high frequency induction heating, and in Patent Literature 1 for example, a technology is known in which high frequency induction heating is performed after cold drawing, and the microstructure is controlled by quenching and tempering. According to the technology, delayed fracture property is improved, and it is achieved by making the microstructure fraction of pearlite 30% or less and the microstructure fraction of martensite or bainite 70% or more, thereafter performing cold drawing with a predetermined area reduction ratio, then performing quenching and tempering, and thereby reducing the amount of undissolved carbide that becomes the origin of the delayed fracture.

According to Patent Literature 2, in the example, a rolled material is drawn and is high frequency heated for quenching and tempering treatment. According to the technology, a spring is achieved which secures high strength and high toughness while securing coiling performance. However, in the technology, the coiling performance is mainly addressed, and no consideration has been made with respect to hydrogen embrittlement resistance.

CITATION LIST

Patent Literature

Patent Literature 1: Japanese Unexamined Patent Application Publication No. 2004-143482
Patent Literature 2: Japanese Unexamined Patent Application Publication No. 2006-183137

SUMMARY OF INVENTION

Technical Problem

The present invention has been developed in view of such circumstances as described above, and its object is to provide a high-strength spring steel wire securing hydrogen embrittlement resistance even when the adding amount of the alloy element is suppressed in manufacturing a high-strength spring steel wire whose tensile strength is 1,900 MPa or more, a manufacturing process therefor, and a high-strength spring.

Solution to Problem

The spring steel wire of the present invention which could solve the problems described above is a high-strength spring steel wire with 80 area % or more of tempered martensite and 1,900 MPa or more of the tensile strength, in which:
the wire contains:
C: 0.50-0.70% (means mass %, hereinafter the same with respect to the chemical composition);
Si: 1.50-2.3%;
Mn: 0.3-1.5%;
P: 0.015% or less (exclusive of 0%);
S: 0.015% or less (exclusive of 0%); and
Al: 0.001-0.10%,
C and Si satisfies the relation of the expression (1) below, the remainder consists of iron and inevitable impurities, prior austenite grain size number is No. 10 or more, and hydrogen absorption amount is 14.0 ppm or more.

$$0.73\% \leq [C]+[Si]/8 \leq 0.90\% \quad (1)$$

where [C] and [Si] express the content (mass %) of C and Si respectively.

According to the necessity, the spring steel wire of the present invention may further contain one or more elements that belong any of (a)-(f) below.
(a) at least one element out of Cu: 0.7% or less (exclusive of 0%) and Ni: 0.7% or less (exclusive of 0%)
(b) Ti: 0.10% or less (exclusive of 0%)
(c) B: 0.010% or less (exclusive of 0%)
(d) at least one element out of Nb: 0.10% or less (exclusive of 0%) and Mo: 0.5% or less (exclusive of 0%)
(e) V: 0.4% or less (exclusive of 0%)
(f) Cr: 0.8% or less (exclusive of 0%)
The diameter of the spring steel wire of the present invention is approximately 7-20 mm.

On the other hand, the method for manufacturing a spring steel wire of the present invention which could solve the problems described above is characterized to perform manufacturing using a steel material that satisfies the chemical composition described above and quenching and tempering the steel material so as to satisfy all of the conditions described below.

(Quenching Condition)
Heating temperature T1 for quenching: 850-1,000° C.
Average temperature raising rate HR1 from 100° C. to the heating temperature T1 for quenching: 40° C./s or more
Holding time t1 at the heating temperature T1 for quenching: 90 s or less
Average cooling rate CR1 from 300° C. to 80° C. after the heating for quenching: 5° C./s or more and 100° C./s or less (Tempering Condition)
Heating temperature T2 for tempering: 350-550° C.
Average temperature raising rate HR2 from 100° C. to the heating temperature T2 for tempering: 30° C./s or more
Holding time t2 at the heating temperature T2 for tempering: 90 s or less
Average cooling rate CR2 from the heating temperature T2 for tempering to 100° C. after the heating for tempering: 30° C./s or more The present invention includes a high-strength spring formed using such high-strength spring steel wire as described above, and hydrogen embrittlement resistance becomes excellent in such high-strength spring also.

Advantageous Effects of Invention

According to the present invention, a spring steel wire is obtained which exhibits high strength of 1,900 MPa or more of the tensile strength and is excellent in hydrogen embrittlement resistance even when a large amount of alloy elements is not added. Such high-strength spring steel wire can suppress the steel material cost, and becomes excellent in hydrogen embrittlement resistance. As a result, a high strength spring extremely hardly causing hydrogen embrittlement (for example a coil spring such as a suspension spring and the like which is one of the components for automobiles) can be supplied at a low cost.

DESCRIPTION OF EMBODIMENTS

The present inventors studied the effects of the condition of quenching, tempering and the like exerted on the property of the steel wire from various aspects. As a result, it was found out that the hydrogen trap site largely increased and hydrogen embrittlement resistance significantly improved by properly controlling the amount of C and Si which were inexpensive and main elements to obtain a low alloy steel, and performing short time heating by high frequency induction heating, and the present invention was completed. Below, respective requirements specified in the present invention will be described.

(Tempered Martensite: 80 Area % or More)

With respect to the steel wire of the present invention, the microstructure is mainly of tempered martensite (80 area % or more in terms of the rate relative to the total microstructure). In order to secure high strength and high toughness in the steel wire, it is necessary to achieve the microstructure mainly of tempered martensite by performing quenching and tempering treatment. Tempered martensite is preferably 90 area % or more (more preferably 100 area %). Although bainite, ferrite, pearlite and the like can be contained as the microstructure other than tempered martensite, even when these are contained, they are 10 area % or less, preferably 5 area % or less (more preferably 0 area %).

(Prior Austenite Grain Size Number is No. 10 or More)

In order to secure excellent hydrogen embrittlement resistance, it is effective to refine the prior austenite grain. From such viewpoint, it is necessary that the prior austenite grain size number is made No. 10 or more, preferably No. 11 or more, and more preferably No. 12 or more. Also, in order that the prior austenite grain size number is No. 10 or more, it is effective to perform quenching and tempering by high frequency induction heating. By ordinary furnace heating, heating rate is slow and heating time becomes long, grain size growth in high temperature heating becomes extreme, coarsening of the grain size occurs, and therefore the prior austenite grain cannot be refined.

(Hydrogen Absorption Amount: 14.0 ppm or More)

With respect to the steel wire of the present invention, although the chemical composition should be properly set (will be described below), the hydrogen absorption amount in the steel wire also should be set properly. This hydrogen absorption amount expresses allowable hydrogen amount in the steel wire, and as the hydrogen absorption amount increases, hydrogen embrittlement resistance improves. From such viewpoint, the hydrogen absorption amount should be made 14.0 ppm or more, preferably 14.5 ppm or more, and more preferably 15.0 ppm or more. The reason hydrogen embrittlement resistance improves by properly setting the hydrogen absorption amount is probably that, the hydrogen absorption amount in the present test expresses the hydrogen amount trapped by fine carbide, hydrogen intrusion into and accumulation in the grain boundary can be suppressed by increasing the hydrogen amount trapped by fine carbide, hydrogen crack resistance (hydrogen embrittlement resistance) which is occurrence of a crack by the grain boundary fracture can be improved. Also, because the intrusion rate of hydrogen into the steel increases when the hydrogen absorption amount increases, from the viewpoint of suppressing intrusion of excessive hydrogen, the hydrogen absorption amount is preferably 25 ppm or less, and more preferably 20 ppm or less.

In order to increase the hydrogen absorption amount, it is important to finely disperse Fe—C system carbide (with respect to carbide in steel, Fe—C system carbide is dominant) in steel. In order to finely disperse Fe—C system carbide (hereinafter referred to simply as "carbide"), it is necessary to suppress formation of coarse carbide in steel (1,200° C. soaking by the example described below is also related), to make the amount of C that is the main element (excepting Fe) of carbide and the amount of Si that exerts effect on the size of carbide precipitated to fall in a proper range, to increase the amount of carbide, and to form fine carbide. Also, it is necessary to control quenching and tempering in a proper range (will be described below), to suppress formation of carbide not yet solid-dissolved, and to form fine carbide.

Although the spring steel wire of the present invention is basically a low alloy steel that suppresses the content of alloy elements, the reasons for limiting the range of each component (element) in the chemical composition thereof are as described below.

(C: 0.50-0.70%)

C is an element required for securing high strength of the spring steel wire, and is required also for forming fine carbide that becomes a hydrogen trap site. From such viewpoint, C should be contained by 0.50% or more. Preferable lower limit of the C content is 0.54% (more preferably 0.58%). However, when the C content becomes excessive, coarse retained austenite and carbide not yet solid-dissolved are liable to be formed even after quenching and tempering, and there is a case hydrogen embrittlement resistance deteriorates to the contrary. Further, because C is also an element deteriorating corrosion resistance, in order to improve corrosion fatigue property of the spring product (suspension spring and the like) which is the final product, the C content should be suppressed. From such viewpoint, the C content should be 0.70% or less. Preferable upper limit of the C content is 0.65% (more preferably 0.62%).

(Si: 1.50-2.3%)

Si is an element required for securing the strength, and has an effect of refining carbide. In order to exert such effects effectively, Si should be contained by 1.50% or more. Preferable lower limit of the Si content is 1.7% (more preferably 1.9%). On the other hand, because Si is also an element promoting decarburization, when Si is contained excessively, formation of the decarburizing layer on the surface of the steel is promoted, a peeling step becomes necessary for removing the decarburizing layer, and increase of the manufacturing cost is incurred. Further, carbide not yet solid-dissolved increases, and hydrogen embrittlement resistance deteriorates. From such viewpoint, in the present invention, the upper limit of the Si content was made 2.3%. Preferable upper limit of the Si content is 2.2% (more preferably 2.1%).

$$(0.73 \leq [C]+[Si]/8 \leq 0.90\%: \text{relation of the expression}) \quad (1)$$

When ([C]+[Si]/8) is within the range of 0.73% or more and 0.90% or less, carbide that becomes a hydrogen trap site is precipitated finely and in large amounts, and hydrogen embrittlement resistance improves. When the value of ([C]+[Si]/8) becomes less than 0.73%, the amount of fine carbide that becomes a hydrogen trap site reduces, and hydrogen embrittlement resistance deteriorates. On the other hand, when the value of ([C]+[Si]/8) is greater than 0.90%, coarse retained austenite and carbide not yet solid-dissolved are liable to be formed, and hydrogen embrittlement resistance deteriorates. Preferable lower limit of ([C]+[Si]/8) is 0.75% (more preferably 0.78%, further more preferably 0.81%), and preferable upper limit is 0.89% (more preferably 0.87%).

(Mn: 0.3-1.5%)

Mn is an element utilized as a deoxidizing element, and useful in forming MnS by reacting with S that is a harmful element in steel and making S harmless. Further, Mn is also an element contributing to improvement of the strength. In order to exert such effects effectively, Mn should be contained by 0.3% or more. Preferable lower limit of the Mn content is 0.5% (more preferably 0.7%). However, when the Mn content becomes excessive, quenchability is enhanced, toughness drops, and hydrogen embrittlement resistance deteriorates. From such viewpoint, the Mn content should be 1.5% or less. Preferable upper limit of the Mn content is 1.3% (more preferably 1.1%).

(P: 0.015% or Less (Exclusive of 0%))

Because P is a harmful element that deteriorates ductility (coiling performance) of the steel wire, P is preferable to be as little as possible. Also, P is liable to segregate in the grain boundary to cause grain boundary embrittlement, the grain boundary is liable to be broken by hydrogen, and P adversely affects hydrogen embrittlement resistance. From such viewpoint, the upper limit thereof is made 0.015%, preferably 0.010% (more preferably 0.008%).

(S: 0.015% or Less (Exclusive of 0%))

Similarly to P described above, because S is a harmful element that deteriorates ductility (coiling performance) of the steel wire, S is preferable to be as little as possible. Also, S is liable to segregate in the grain boundary to cause grain boundary embrittlement, the grain boundary is liable to be broken by hydrogen, and S adversely affects hydrogen embrittlement resistance. From such viewpoint, the upper limit thereof is made 0.015%, preferably 0.010% (more preferably 0.008%).

(Al: 0.001-0.10%)

Al is added mainly as a deoxidation element. Also, Al makes solid-dissolved N harmless by reacting with N and forming AlN, and contributes also to refinement of the microstructure. In order to exert such effects sufficiently, the Al content should be 0.001% or more, preferably 0.002% or more. However, similarly to Si, Al is also an element promoting decarburization. Therefore, in the spring steel wire containing Si much, it is necessary to suppress the Al amount, and the upper limit of the Al content was made 0.10% in the present invention. The Al content is preferably 0.07% or less, more preferably 0.030% or less, and still more preferably 0.020% or less.

The chemical composition of the steel of the present invention is as described above, and the remainder is consisting of iron and inevitable impurities. With respect to the spring steel wire of the present invention, high strength and excellent coiling performance and hydrogen embrittlement resistance can be achieved by the chemical composition described above even when the alloy elements such as Cu is suppressed basically, however, with an aim of provision of corrosion resistance and so on according to the use, elements described below may be further contained. The reasons for setting the preferable range of these elements are as described below.

(At Least One Element Out of Cu: 0.7% or Less (Exclusive of 0%) and Ni: 0.7% or Less (Exclusive of 0%))

Cu is an element effective in suppressing surface layer decarburization and improving corrosion resistance. However, when Cu is contained excessively, a crack occurs in hot working and the cost increases. Therefore, in the present invention, the upper limit of the Cu content is preferably 0.7%, more preferably 0.5%, and further more preferably 0.3% (still further more preferably 0.18%). Also, in order to exert such effects, Cu is contained preferably 0.05% or more, and more preferably 0.10% or more.

Similarly to Cu, Ni is an element effective in suppressing surface layer decarburization and improving corrosion resistance. However, when Ni is contained excessively, the cost increases. Therefore, in the present invention, the upper limit of the Ni content is preferably 0.7%, more preferably 0.5%, and still more preferably 0.3% (still further more preferably 0.18%). Also, in order to exert such effects, Ni is to be contained preferably 0.05% or more, and more preferably 0.10% or more.

(Ti: 0.10% or Less (Exclusive of 0%))

Ti is an element useful in reacting with S to form sulfide and making S harmless. Further, Ti also has the effects of forming carbonitride and refining the microstructure. However, when the Ti content becomes excessive, there is a case that coarse Ti-sulfide is formed and ductility deteriorates. Therefore, in the present invention, preferable upper limit of the Ti content was made 0.10%. From the viewpoint of the cost reduction, it is more preferable to suppress the Ti content to 0.07% or less. Also, in order to exert the effects described above, Ti is to be contained preferably 0.02% or more, and more preferably 0.05% or more.

(B: 0.010% or Less (Exclusive of 0%))

B is a quenchability improving element, has an effect of strengthening the prior austenitic grain boundary, and is an element contributing to suppression of the fracture. However, even when B is contained excessively, the effects described above saturate, and therefore the upper limit of the B content is preferably 0.010%, more preferably 0.0050%.

Also, in order to effectively exert the effects described above, the B content is preferably 0.0005% or more, and more preferably 0.0010% or more.

(At Least One Element Out of Nb: 0.10% or Less (Exclusive of 0%) and Mo: 0.5% or Less (Exclusive of 0%))

Nb is an element forming carbonitride with C and N, and contributing mainly to refinement of the microstructure. However, when the Nb amount becomes excessive, coarse carbonitride is formed, and ductility of the steel deteriorates. Therefore, the upper limit of the Nb content is preferably 0.10%. From the viewpoint of the cost reduction, it is more preferable to suppress the Nb content to 0.07% or less. Also, in order to effectively exert the effects described above, the Nb content is preferably 0.003% or more, and more preferably 0.005% or more.

Similarly to Nb, Mo is also an element forming carbonitride with C and N, and contributing to refinement of the microstructure. Further, Mo is also an element effective also in securing the strength after tempering. However, when the Mo content becomes excessive, coarse carbonitride is formed, and ductility (coiling performance) of the steel deteriorates. Therefore, the upper limit of the Mo content is preferably 0.5%, and more preferably 0.4%. Also, in order to effectively exert the effects described above, the Mo content is preferably 0.15% or more, and more preferably 0.20% or more.

(V: 0.4% or Less (Exclusive of 0%))

V contributes to improvement of the strength and refinement of the grain. However, when the V content becomes excessive, the cost increases. Therefore, the upper limit of the V content is preferably 0.4%, and more preferably 0.3%. Also, in order to effectively exert the effects described above, the V content is preferably 0.1% or more, and more preferably 0.15% or more.

(Cr: 0.8% or Less (Exclusive of 0%))

Cr is an element effective in improving corrosion resistance. However, Cr is an element having strong tendency of forming carbide and forming own carbide in steel, and is liable to be dissolved in cementite at a high concentration. Although it is effective to contain Cr of a small amount, in high frequency induction heating, because heating time of the quenching step becomes short, austenitization in which carbide, cementite and the like are dissolved in the base metal is liable to become insufficient. Therefore, when Cr is contained much, undissolved cementite is generated in which Cr-based carbide and metal Cr are solid-dissolved at a high concentration, the stress concentrates thereon, therefore fracture is liable to occur, and hydrogen embrittlement resistance comes to deteriorate. From such viewpoint, the upper limit in containing Cr is preferably 0.8%, and more preferably 0.5% (still more preferably 0.4%). Also, in order to effectively exert the effects described above, the Cr content is preferably 0.01% or more, and more preferably 0.05% or more.

Next, a method for manufacturing the spring steel wire of the present invention will be described. The spring steel wire of the present invention can be obtained for example by melting steel, obtaining a steel wire rod thereafter by rolling, performing cold drawing work (formed into steel wire) thereafter if necessary, and then, performing induction hardening and tempering treatment. In order to easily form the microstructure described above that can secure high strength and can improve hydrogen embrittlement resistance simultaneously, it is necessary to perform the quenching and tempering treatment by procedures described below. Also, the values of the heat treatment condition described below are values measured on the surface of the steel.

(Quenching Condition)

When the heating temperature T1 for quenching becomes higher than 1,000° C., the prior austenite grain is coarsened, and the property (hydrogen embrittlement resistance) deteriorates. Also, when the heating temperature T1 for quenching is excessively high, the grain is coarsened, the amount of the grain boundary reduces, and fine carbide cannot be obtained (because carbide precipitates preferentially from the grain boundary, as there are more grain boundaries, carbide is easily dispersed). Therefore, the heating temperature T1 for quenching is made 1,000° C. or below, preferably 980° C. or below, and more preferably 930° C. or below. On the other hand, when the heating temperature T1 for quenching becomes lower than 850° C., carbide is not sufficiently solid-dissolved, austenitization cannot be sufficiently effected, tempered martensite microstructure cannot be sufficiently secured in this quenching and tempering step, and high strength cannot be secured. Also, when the heating temperature T1 for quenching is excessively low, carbide is not sufficiently solid-dissolved, carbide not yet solid-dissolved remains, and the amount of carbide becomes insufficient. The heating temperature T1 for quenching is preferably 870° C. or above, and more preferably 900° C. or above.

When the average temperature raising rate HR1 from 100° C. to the heating temperature T1 for quenching becomes slower than 40° C./s, the prior austenite grain is coarsened, and the property deteriorates. Also, when the average temperature raising rate HR1 is excessively slow, the grain is coarsened, the amount of the grain boundary reduces, and fine carbide cannot be secured. Therefore, the average temperature raising rate HR1 is made 40° C./s or more, preferably 50° C./s or more, and more preferably 100° C./s or more. On the other hand, the upper limit of the average temperature raising rate HR1 is approximately 400° C./s from the viewpoint of temperature control. Also, the average temperature raising rate from the room temperature to 100° C. is no object in particular.

When the holding time t1 at the heating temperature T1 for quenching becomes longer than 90 s, the prior austenite grain is coarsened, and the property (hydrogen embrittlement resistance) deteriorates. Also, when the holding time t1 is excessively long, the grain is coarsened, the amount of the grain boundary reduces, and fine carbide cannot be obtained. Therefore, the holding time t1 should be made 90 s or less. The holding time t1 is preferably 60 s or less, and more preferably 40 s or less. Also, in order to prevent insufficient austenitization caused by insufficient dissolution of carbide and to obtain desired microstructure (the microstructure mainly of tempered martensite), it is preferable to make this t1 5 s or more. Also, when the holding time t1 is excessively short, carbide is not sufficiently solid-dissolved, carbide not yet solid-dissolved remains, and the amount of carbide becomes insufficient. The holding time t1 is more preferably 10 s or more, and still more preferably 15 s or more.

When the average cooling rate (CR1) from 300° C. to 80° C. after the heating for quenching is excessively slow, quenching becomes insufficient, and the strength cannot be secured. Therefore, the average cooling rate CR1 should be 5° C./s or more. The average cooling rate CR1 is preferably 10° C./s or more, and more preferably 20° C./s or more. Also, the upper limit of the average cooling rate CR1 is approximately 100° C./s.

(Tempering Condition)

When the heating temperature T2 for tempering is excessively low, such problems occur that tempering is not effected sufficiently, the strength is increased excessively, and the value of the reduction of area extremely drops. On the other hand, when the heating temperature T2 for tempering becomes high, it becomes hard to achieve tensile strength: 1,900 MPa or more (preferably 2,000 MPa or more). The range of the heating temperature T2 for tempering is the range of 350-550° C. (preferably 400-500° C.), and can be appropriately determined according to the required strength.

When the average temperature raising rate HR2 from 100° C. to the heating temperature T2 for tempering is slow, carbide is coarsened, and desired property cannot be secured. Also, when the average temperature raising rate HR2 is excessively slow, formation frequency of carbide from the grain boundary drops, and fine carbide is not secured. Therefore, in the present invention, the average temperature raising rate HR2 is made 30° C./s or more, preferably 40° C./s or more, and still more preferably 50° C./s or more. However, when the average temperature raising rate HR2 is excessively quick, temperature control becomes hard, the strength is liable to be dispersed, and therefore 300° C./s or less is preferable, and 200° C./s or less is more preferable. Also, the average temperature raising rate from the room temperature to 100° C. is no object in particular.

When the holding time t2 at the heating temperature T2 for tempering becomes longer than 90 s, carbide is coarsened, and hydrogen embrittlement resistance deteriorates. The holding time t2 is preferably 70 s or less, more preferably 50 s or less, still more preferably 40 s or less, and especially preferably 12 s or less. On the other hand, the present invention is on the premise of performing high frequency induction heating, when the holding time t2 is excessively short and in the case of the steel wire of a large diameter, dispersion of the hardness within the cross section in the peripheral direction is liable to occur, and stable improvement of the strength becomes hard. Therefore, in the present invention, the holding time t2 is preferably 5 s or more, more preferably 7 s or more, and still more preferably 10 s or more. Also, the holding time t2 then may be appropriately adjusted within the range described above according to the required strength.

When the average cooling rate CR2 from the heating temperature T2 for tempering (it is 400° C. however when T2 described above is 400° C. or above) to 100° C. after the heating for tempering is slow, carbide is coarsened, and desired property cannot be secured (frequency of formation of carbide from the grain boundary drops, and fine carbide is not secured). Therefore, in the present invention, the average cooling rate CR2 is made 30° C./s or more, preferably 40° C./s or more, and more preferably 50° C./s or more. Also, the upper limit of the average cooling rate CR2 is approximately 300° C./s. Further, the average cooling rate from 100° C. to the room temperature is not particularly limited.

The diameter of the spring steel wire of the present invention is 7-20 mm for example (preferably 10-15 mm). This spring steel wire is thereafter formed into a high strength spring by spring working, and a high strength spring excellent in hydrogen embrittlement resistance and exerting excellent mechanical properties is obtained.

In order to secure excellent hydrogen embrittlement resistance, it is necessary to reduce segregation of the molten steel and to reduce carbide not yet solid-dissolved and coarse retained austenite even for the composition system in which C and Si have been increased. Also, it is necessary to homogenize the composition in steel by reducing segregation, to suppress segregation of carbide formed in the tempered martensite microstructure, to disperse carbide in steel more finely, and to increase the amount of hydrogen trapped by fine carbide. For the purpose, it is important to perform soaking of heating at 1,200° C. or above after melting. Also, it is important to adjust the rolling temperature during rolling so that the temperature of the wire (wire temperature) becomes 900° C. or above after the diameter becomes 30 mm or less at which there is a segregation reduction effect even at a low temperature.

The present application is to claim the benefit of the right of priority based on the Japanese Patent Application No. 2012-279437 applied on Dec. 21, 2012. Entire contents of the specification of the Japanese Patent Application No. 2012-279437 applied on Dec. 21, 2012 are incorporated by reference into the present application.

EXAMPLES

Although the present invention will be described below more specifically referring to examples, the present invention is not to be limited by the examples below, it is a matter of course that the present invention can be also implemented with modifications being appropriately added within the range adaptable to the purposes described above and below, and any of them is to be included within the technical range of the present invention.

Steel (steel No. 1-63) with the chemical composition shown in Tables 1 and 2 below was molten by a small size vacuum melting furnace, was forged into a billet of 155 mm square (the cross-sectional shape was 155 mm×155 mm), and was thereafter subjected to soaking at 1,200° C. for 1 hour. By performing soaking, segregation is reduced, carbide not yet solid-dissolved and coarse retained austenite can be reduced even for the composition system in which C and Si have been increased, and excellent hydrogen embrittlement resistance can be obtained. Also, because segregation is reduced, the composition in steel becomes homogenous, eccentric location of carbide formed is eliminated in the tempered martensite microstructure, carbide can be dispersed in steel more finely, and the amount of hydrogen trapped by fine carbide can be increased. After soaking, hot rolling was performed, and the wire with 14.3 mm diameter was obtained. The rolling temperature was adjusted so that the wire temperature became 900° C. or above at a stage the wire diameter became 30 mm or less during rolling. Also, after obtaining the steel wire by subjecting the wire to cold drawing work (wire drawing) to 12.0 mm diameter, quenching and tempering were performed with the condition described below by a high frequency induction heating furnace, and the steel wire for spring was obtained.

(Condition of Induction Hardening)
Heating temperature T1 for quenching: 930° C.
Average temperature raising rate from 100° C. to the heating temperature T1 for quenching: 200° C./s
Holding time t1 at the heating temperature T1 for quenching: 15 s
Average cooling rate CR1 from 300° C. to 80° C. after the heating for quenching: 80° C./s
(Condition of Tempering by High Frequency)
Heating temperature T2 for tempering: to be set within the range of 350-550° C. so that 2,000 MPa is secured
Average temperature raising rate HR2 from 100° C. to the heating temperature T2 for tempering: 100° C./s
Holding time t2 at the heating temperature T2 for tempering: 10 s Average cooling rate CR2 from the heating temperature T2 to 100° C. after the heating for tempering: 100° C./s
(Condition of Quenching by Furnace Heating)
Heating temperature T1 for quenching: 900° C.
Average temperature raising rate from 100° C. to the heating temperature T1 for quenching: 2° C./s
Holding time t1 at the heating temperature for quenching: 10 min
Cooling rate for quenching: 80° C./s (Condition of Tempering by Furnace Heating)
Heating temperature T2 for tempering: to be set within the range of 300-500° C. so that 2,000 MPa is secured
Average temperature raising rate from 100° C. to the heating temperature T2 for tempering: 2° C./s
Holding time t2 at the heating temperature T2 for tempering: 60 min
Average cooling rate from the heating temperature T2 to 100° C. after the heating for tempering: 100° C./s

TABLE 1

| Steel No. | Chemical composition* (mass %) | | | | | | | | | | | | | | Parameter [C] + [Si]/B | Judgment |
|---|---|---|---|---|---|---|---|---|---|---|---|---|---|---|---|---|
| | C | Si | Mn | P | S | Al | Cu | Ni | Ti | B | Nb | Mo | V | Cr | | |
| 1 | 0.42 | 1.8 | 0.7 | 0.001 | 0.009 | 0.005 | — | — | — | — | — | — | — | — | 0.65 | X |
| 2 | 0.43 | 2.0 | 0.8 | 0.001 | 0.009 | 0.004 | — | — | — | — | — | — | — | — | 0.68 | X |
| 3 | 0.48 | 1.5 | 0.8 | 0.009 | 0.007 | 0.005 | — | — | — | — | — | — | — | — | 0.67 | X |
| 4 | 0.48 | 2.1 | 0.8 | 0.001 | 0.009 | 0.004 | — | — | — | — | — | — | — | — | 0.74 | ○ |
| 5 | 0.51 | 1.8 | 0.8 | 0.009 | 0.007 | 0.006 | — | — | — | — | — | — | — | — | 0.74 | ○ |
| 6 | 0.51 | 2.0 | 0.7 | 0.007 | 0.009 | 0.020 | — | — | — | — | — | — | — | — | 0.76 | ○ |
| 7 | 0.51 | 2.2 | 0.8 | 0.008 | 0.007 | 0.008 | — | — | — | — | — | — | — | — | 0.79 | ○ |
| 8 | 0.55 | 1.6 | 0.9 | 0.009 | 0.008 | 0.004 | — | — | — | — | — | — | — | — | 0.75 | ○ |
| 9 | 0.55 | 2.0 | 0.8 | 0.009 | 0.007 | 0.010 | — | — | — | — | — | — | — | — | 0.80 | ○ |
| 10 | 0.55 | 2.2 | 0.8 | 0.009 | 0.009 | 0.004 | — | — | — | — | — | — | — | — | 0.83 | ○ |
| 11 | 0.60 | 1.6 | 0.7 | 0.009 | 0.007 | 0.004 | — | — | — | — | — | — | — | — | 0.80 | ○ |
| 12 | 0.60 | 2.0 | 0.8 | 0.008 | 0.007 | 0.006 | — | — | — | — | — | — | — | — | 0.85 | ○ |
| 13 | 0.60 | 2.1 | 0.8 | 0.007 | 0.009 | 0.005 | — | — | — | — | — | — | — | — | 0.86 | ○ |
| 14 | 0.65 | 1.5 | 0.4 | 0.009 | 0.009 | 0.004 | — | — | — | — | — | — | — | — | 0.84 | ○ |
| 15 | 0.65 | 1.7 | 0.8 | 0.009 | 0.007 | 0.006 | — | — | — | — | — | — | — | — | 0.86 | ○ |
| 16 | 0.65 | 1.9 | 0.9 | 0.008 | 0.009 | 0.040 | — | — | — | — | — | — | — | — | 0.89 | ○ |
| 17 | 0.69 | 1.5 | 0.8 | 0.009 | 0.008 | 0.008 | — | — | — | — | — | — | — | — | 0.88 | ○ |
| 18 | 0.69 | 1.6 | 0.8 | 0.009 | 0.009 | 0.004 | — | — | — | — | — | — | — | — | 0.89 | ○ |
| 19 | 0.63 | 2.2 | 0.8 | 0.009 | 0.009 | 0.004 | — | — | — | — | — | — | — | — | 0.91 | X |
| 20 | 0.71 | 1.8 | 0.7 | 0.007 | 0.007 | 0.010 | — | — | — | — | — | — | — | — | 0.94 | X |
| 21 | 0.72 | 1.6 | 0.8 | 0.008 | 0.007 | 0.004 | — | — | — | — | — | — | — | — | 0.92 | X |
| 22 | 0.62 | 2.5 | 0.7 | 0.009 | 0.008 | 0.006 | — | — | — | — | — | — | — | — | 0.93 | X |
| 23 | 0.52 | 1.6 | 0.8 | 0.007 | 0.007 | 0.004 | — | — | — | — | — | — | — | — | 0.72 | X |
| 24 | 0.55 | 1.3 | 0.8 | 0.009 | 0.009 | 0.004 | — | — | — | — | — | — | — | — | 0.71 | X |
| 25 | 0.58 | 2.4 | 0.9 | 0.009 | 0.007 | 0.008 | — | — | — | — | — | — | — | — | 0.88 | ○ |
| 26 | 0.61 | 1.4 | 0.8 | 0.008 | 0.007 | 0.004 | — | — | — | — | — | — | — | — | 0.79 | ○ |
| 27 | 0.60 | 2.0 | 1.2 | 0.009 | 0.007 | 0.010 | — | — | — | — | — | — | — | — | 0.85 | ○ |
| 28 | 0.61 | 2.0 | 1.8 | 0.009 | 0.007 | 0.030 | — | — | — | — | — | — | — | — | 0.86 | ○ |
| 29 | 0.59 | 2.0 | 0.8 | 0.025 | 0.007 | 0.006 | — | — | — | — | — | — | — | — | 0.84 | ○ |
| 30 | 0.60 | 2.1 | 0.8 | 0.009 | 0.025 | 0.006 | — | — | — | — | — | — | — | — | 0.86 | ○ |

*Remainder: iron and inevitable impurities other than P, S

TABLE 2

| Steel No. | Chemical composition* (mass %) | | | | | | | | | | | | | | Parameter [C] + [Si]/B | Judgment |
|---|---|---|---|---|---|---|---|---|---|---|---|---|---|---|---|---|
| | C | Si | Mn | P | S | Al | Cu | Ni | Ti | B | Nb | Mo | V | Cr | | |
| 31 | 0.59 | 2.0 | 0.8 | 0.009 | 0.007 | 0.010 | 0.10 | — | — | — | — | — | — | — | 0.84 | ○ |
| 32 | 0.61 | 2.0 | 0.7 | 0.009 | 0.009 | 0.004 | 0.20 | — | — | — | — | — | — | — | 0.86 | ○ |
| 33 | 0.60 | 1.9 | 0.8 | 0.009 | 0.007 | 0.004 | 0.15 | 0.15 | — | — | — | — | — | — | 0.84 | ○ |
| 34 | 0.59 | 2.2 | 0.7 | 0.009 | 0.007 | 0.004 | — | 0.10 | — | — | — | — | — | — | 0.87 | ○ |
| 35 | 0.60 | 2.0 | 0.9 | 0.009 | 0.009 | 0.004 | — | 0.20 | — | — | — | — | — | — | 0.85 | ○ |
| 36 | 0.60 | 1.9 | 0.8 | 0.008 | 0.009 | 0.004 | — | — | 0.07 | — | — | — | — | — | 0.84 | ○ |
| 37 | 0.59 | 2.0 | 0.8 | 0.009 | 0.008 | 0.006 | — | — | 0.06 | 0.0025 | — | — | — | — | 0.84 | ○ |
| 38 | 0.60 | 1.9 | 0.7 | 0.007 | 0.009 | 0.008 | — | — | — | 0.0020 | — | — | — | — | 0.84 | ○ |
| 39 | 0.59 | 2.0 | 0.8 | 0.006 | 0.009 | 0.005 | — | — | — | — | 0.07 | — | — | — | 0.84 | ○ |
| 40 | 0.60 | 1.9 | 0.9 | 0.006 | 0.007 | 0.005 | — | — | — | — | — | 0.3 | — | — | 0.84 | ○ |
| 41 | 0.60 | 1.9 | 0.9 | 0.006 | 0.007 | 0.005 | — | — | — | — | — | — | 0.3 | — | 0.84 | ○ |
| 42 | 0.60 | 1.9 | 0.8 | 0.007 | 0.009 | 0.008 | — | — | — | — | — | — | — | 0.14 | 0.84 | ○ |
| 43 | 0.51 | 1.8 | 0.8 | 0.009 | 0.007 | 0.006 | — | — | — | — | — | — | — | — | 0.74 | ○ |
| 44 | 0.51 | 2.0 | 0.7 | 0.007 | 0.009 | 0.020 | — | — | — | — | — | — | — | — | 0.76 | ○ |
| 45 | 0.51 | 2.2 | 0.8 | 0.008 | 0.007 | 0.008 | — | — | — | — | — | — | — | — | 0.79 | ○ |
| 46 | 0.55 | 1.6 | 0.9 | 0.009 | 0.008 | 0.004 | — | — | — | — | — | — | — | — | 0.75 | ○ |
| 47 | 0.55 | 2.0 | 0.8 | 0.009 | 0.007 | 0.010 | — | — | — | — | — | — | — | — | 0.80 | ○ |
| 48 | 0.55 | 2.2 | 0.8 | 0.009 | 0.009 | 0.004 | — | — | — | — | — | — | — | — | 0.83 | ○ |
| 49 | 0.60 | 1.6 | 0.7 | 0.009 | 0.007 | 0.004 | — | — | — | — | — | — | — | — | 0.80 | ○ |
| 50 | 0.60 | 2.0 | 0.8 | 0.008 | 0.007 | 0.006 | — | — | — | — | — | — | — | — | 0.85 | ○ |
| 51 | 0.60 | 2.1 | 0.8 | 0.007 | 0.009 | 0.005 | — | — | — | — | — | — | — | — | 0.86 | ○ |
| 52 | 0.65 | 1.5 | 0.4 | 0.009 | 0.009 | 0.004 | — | — | — | — | — | — | — | — | 0.84 | ○ |
| 53 | 0.65 | 1.7 | 0.8 | 0.009 | 0.007 | 0.006 | — | — | — | — | — | — | — | — | 0.86 | ○ |
| 54 | 0.65 | 1.9 | 0.9 | 0.008 | 0.009 | 0.040 | — | — | — | — | — | — | — | — | 0.89 | ○ |

TABLE 2-continued

| Steel No. | Chemical composition* (mass %) | | | | | | | | | | | | | | Parameter | |
|---|---|---|---|---|---|---|---|---|---|---|---|---|---|---|---|---|
| | C | Si | Mn | P | S | Al | Cu | Ni | Ti | B | Nb | Mo | V | Cr | [C] + [Si]/B | Judgment |
| 55 | 0.69 | 1.5 | 0.8 | 0.009 | 0.008 | 0.008 | — | — | — | — | — | — | — | — | 0.88 | ○ |
| 56 | 0.69 | 1.6 | 0.8 | 0.009 | 0.009 | 0.004 | — | — | — | — | — | — | — | — | 0.89 | ○ |
| 57 | 0.61 | 2.1 | 0.9 | 0.008 | 0.008 | 0.005 | — | — | — | — | — | — | — | 0.4 | 0.87 | ○ |
| 58 | 0.61 | 2.1 | 0.9 | 0.009 | 0.008 | 0.005 | — | — | — | — | — | — | — | 0.5 | 0.87 | ○ |
| 60 | 0.58 | 2.0 | 0.8 | 0.008 | 0.009 | 0.03 | 0.22 | 0.22 | — | 0.0025 | — | — | — | — | 0.83 | ○ |
| 61 | 0.60 | 1.8 | 0.8 | 0.009 | 0.008 | 0.005 | 0.15 | 0.15 | — | 0.0020 | — | — | — | 0.2 | 0.83 | ○ |
| 62 | 0.60 | 2.1 | 0.7 | 0.007 | 0.009 | 0.006 | 0.15 | 0.15 | 0.07 | — | — | — | — | — | 0.86 | ○ |
| 63 | 0.61 | 2.0 | 0.8 | 0.006 | 0.009 | 0.03 | 0.15 | 0.15 | 0.06 | — | — | — | — | 0.2 | 0.86 | ○ |

*Remainder: iron and inevitable impurities other than P, S

Using the steel wire obtained, evaluation of the steel microstructure (measurement of the prior austenite grain size number, measurement of the tempered martensite fraction), evaluation of the tensile properties (measurement of the tensile strength), and evaluation of the hydrogen embrittlement resistance and the amount of hydrogen in steel were executed by methods described below.

(Measurement of Prior Austenite Grain Size Number)

The specimen was taken so that the position of D/4 of the transverse cross section of the steel wire became the observation surface, this specimen taken was embedded in a resin, the prior austenite grain boundary was made to appear using a picric acid-basis etching liquid after polishing, and the prior austenite grain size number was obtained according to a method specified in JIS G 0551: 2005. At this time, it was confirmed by an optical microscope of 400 magnifications that tempered martensite was 80 area % or more with respect to the total microstructure in any microstructure.

[Evaluation of Tensile Properties (Evaluation of Coiling Performance)]

The steel wire obtained was machined into JIS No. 14 test specimen, the tensile test was executed according to JIS Z 2241: 1998 in the condition of 10 mm/min of the cross head speed with a universal tester, and the tensile strength TS was measured. Also, those the tensile strength TS of which was 1,900 MPa or more were evaluated to have high strength (passed).

[Evaluation of Hydrogen Embrittlement Resistance (Hydrogen Embrittlement Test)]

The test specimen with 10 mm width×1.5 mm thickness× 65 mm length was cut out from the steel wire. Also, in a state of applying the stress of 1,400 MPa to the test specimen by 4 point bending, the test specimen was immersed in the mixture solution of 0.5 mol/L of sulfuric acid and 0.01 mol/L of potassium thiocyanate. The voltage of −700 mV that was baser than the SCE electrode (saturate calomel electrode) was applied using a potentiostat, and the time until a crack was generated (fracture time) was measured. Also, the case the fracture time was 1,100 s or more was evaluated to be excellent in hydrogen embrittlement resistance (judgment "○").

(Measurement of Hydrogen Absorption Amount in Steel Wire)

The test specimen with 10 mm width×1.0 mm thickness× 30 mm length was cut out from the steel wire. Also, in a state of no stress, the test specimen was immersed in the mixture solution of 0.5 mol/L of sulfuric acid and 0.01 mol/L of potassium thiocyanate. In a state of applying the voltage of −700 mV that was baser than the SCE electrode using a potentiostat, the test specimen was held for 15 hours and was taken out, and the discharged hydrogen amount was measured immediately thereafter. The discharged hydrogen amount was measured by temperature rise analysis using a gas chromatograph mass spectrometer. Measurement was executed with the temperature raising rate of 100° C./h, and the discharged hydrogen amount to 300° C. was made the hydrogen absorption amount. When this hydrogen absorption amount was 14.0 ppm or more, hydrogen amount judgment was made "○".

The results thereof are shown in Tables 3 and 4 below along with the heat treatment condition.

TABLE 3

| Steel No. | Heat treatment condition | Hydrogen embrittlement resistance | | Prior austenite grain size number (No.) | Tensile strength TS (MPa) | Hydrogen absorption amount (ppm) | Hydrogen amount judgment |
|---|---|---|---|---|---|---|---|
| | | Fracture time (s) | Judgment | | | | |
| 1 | High frequency | 810 | X | 10.2 | 2018 | 12.8 | X |
| 2 | High frequency | 860 | X | 10.1 | 2005 | 13.7 | X |
| 3 | High frequency | 853 | X | 10.3 | 2005 | 13.5 | X |
| 4 | High frequency | 1075 | X | 10.3 | 2013 | 13.8 | X |
| 5 | High frequency | 1125 | ○ | 10.5 | 2012 | 14.4 | ○ |
| 6 | High frequency | 1204 | ○ | 10.6 | 2001 | 14.4 | ○ |
| 7 | High frequency | 1348 | ○ | 10.8 | 2020 | 14.7 | ○ |
| 8 | High frequency | 1139 | ○ | 10.7 | 2001 | 14.6 | ○ |
| 9 | High frequency | 1407 | ○ | 10.4 | 2000 | 14.8 | ○ |
| 10 | High frequency | 1500 | ○ | 11.2 | 2007 | 15.0 | ○ |
| 11 | High frequency | 1419 | ○ | 10.7 | 2016 | 14.9 | ○ |
| 12 | High frequency | 1596 | ○ | 10.7 | 2002 | 14.8 | ○ |
| 13 | High frequency | 1662 | ○ | 11.2 | 1997 | 14.1 | ○ |
| 14 | High frequency | 1549 | ○ | 11.3 | 2016 | 14.5 | ○ |
| 15 | High frequency | 1698 | ○ | 11.2 | 2010 | 15.5 | ○ |

TABLE 3-continued

| Steel No. | Heat treatment condition | Hydrogen embrittlement resistance Fracture time (s) | Judgment | Prior austenite grain size number (No.) | Tensile strength TS (MPa) | Hydrogen absorption amount (ppm) | Hydrogen amount judgment |
|---|---|---|---|---|---|---|---|
| 16 | High frequency | 1458 | ○ | 11.3 | 2020 | 15.8 | ○ |
| 17 | High frequency | 1687 | ○ | 11.5 | 2024 | 15.2 | ○ |
| 18 | High frequency | 1385 | ○ | 11.5 | 1993 | 15.2 | ○ |
| 19 | High frequency | 1058 | X | 11.6 | 1993 | 15.0 | ○ |
| 20 | High frequency | 780 | X | 11.6 | 2004 | 15.8 | ○ |
| 21 | High frequency | 998 | X | 11.6 | 2021 | 15.6 | ○ |
| 22 | High frequency | 845 | X | 11.7 | 2002 | 15.4 | ○ |
| 23 | High frequency | 993 | X | 11.2 | 2003 | 13.8 | X |
| 24 | High frequency | 999 | X | 10.8 | 2014 | 13.8 | X |
| 25 | High frequency | 1088 | X | 10.8 | 2017 | 15.0 | ○ |
| 26 | High frequency | 1055 | X | 10.8 | 1995 | 13.8 | X |
| 27 | High frequency | 1256 | ○ | 10.6 | 2015 | 15.2 | ○ |
| 28 | High frequency | 890 | X | 10.6 | 2014 | 15.4 | ○ |
| 29 | High frequency | 758 | X | 10.6 | 2014 | 15.2 | ○ |
| 30 | High frequency | 798 | X | 10.6 | 2001 | 15.4 | ○ |

TABLE 4

| Steel No. | Heat treatment condition | Hydrogen embrittlement resistance Fracture time (s) | Judgment | Prior austenite grain size number (No.) | Tensile strength TS (MPa) | Hydrogen absorption amount (ppm) | Hydrogen amount judgment |
|---|---|---|---|---|---|---|---|
| 31 | High frequency | 1578 | ○ | 10.8 | 2017 | 16.1 | ○ |
| 32 | High frequency | 1598 | ○ | 10.8 | 1994 | 15.8 | ○ |
| 33 | High frequency | 1602 | ○ | 10.9 | 2021 | 15.4 | ○ |
| 34 | High frequency | 1715 | ○ | 10.7 | 2017 | 15.8 | ○ |
| 35 | High frequency | 1585 | ○ | 10.7 | 2004 | 16.2 | ○ |
| 36 | High frequency | 1625 | ○ | 12.2 | 2009 | 17.2 | ○ |
| 37 | High frequency | 1635 | ○ | 12.1 | 2003 | 17.4 | ○ |
| 38 | High frequency | 1588 | ○ | 10.4 | 2008 | 14.8 | ○ |
| 39 | High frequency | 1621 | ○ | 12.2 | 1994 | 15.9 | ○ |
| 40 | High frequency | 1678 | ○ | 12.1 | 1997 | 16.8 | ○ |
| 41 | High frequency | 1687 | ○ | 12.3 | 2005 | 16.9 | ○ |
| 42 | High frequency | 1625 | ○ | 10.8 | 2020 | 15.2 | ○ |
| 43 | Furnace heating | 337 | X | 8.2 | 2017 | 12.0 | X |
| 44 | Furnace heating | 301 | X | 8.4 | 2012 | 10.9 | X |
| 45 | Furnace heating | 287 | X | 8.1 | 2010 | 12.5 | X |
| 46 | Furnace heating | 301 | X | 8.2 | 2005 | 12.2 | X |
| 47 | Furnace heating | 301 | X | 8.4 | 2017 | 12.2 | X |
| 48 | Furnace heating | 319 | X | 8.1 | 2014 | 12.8 | X |
| 49 | Furnace heating | 284 | X | 8.6 | 2018 | 12.0 | X |
| 50 | Furnace heating | 265 | X | 8.7 | 2020 | 13.0 | X |
| 51 | Furnace heating | 299 | X | 8.8 | 1997 | 13.0 | X |
| 52 | Furnace heating | 274 | X | 8.6 | 2008 | 12.5 | X |
| 53 | Furnace heating | 303 | X | 8.7 | 2003 | 12.4 | X |
| 54 | Furnace heating | 268 | X | 8.8 | 1995 | 12.8 | X |
| 55 | Furnace heating | 293 | X | 8.8 | 2007 | 12.7 | X |
| 56 | Furnace heating | 286 | X | 8.8 | 2006 | 12.8 | X |
| 57 | High frequency | 1510 | ○ | 10.6 | 2005 | 14.8 | ○ |
| 58 | High frequency | 1658 | ○ | 10.9 | 2009 | 14.6 | ○ |
| 60 | High frequency | 1605 | ○ | 10.8 | 2000 | 15.4 | ○ |
| 61 | High frequency | 1600 | ○ | 10.9 | 2005 | 15.6 | ○ |
| 62 | High frequency | 1602 | ○ | 12.1 | 2009 | 17.1 | ○ |
| 63 | High frequency | 1626 | ○ | 12.2 | 2010 | 17.2 | ○ |

From these results, following consideration can be made. Those of the steel Nos. 5-18, 27, 31-42, 57-63 are examples satisfying the requirements specified in the present invention, and it is known that excellent hydrogen embrittlement resistance has been exerted.

On the other hand, those of the steel Nos. 1-4, 19-26, 28-30, 43-56 are the comparative examples not satisfying any of the requirements specified in the present invention, and hydrogen embrittlement resistance is deteriorated. More specifically, those of the steel Nos. 1-3 are cases the value of [C]+[Si]/8 does not satisfy the range specified in the present invention (the C content is insufficient, and the hydrogen amount judgment is also "×"), it is presumed that the number of pieces of fine carbide becomes insufficient, and hydrogen embrittlement resistance is deteriorated. Further, that of the steel No. 4 is a case the C content is insufficient (the hydrogen amount judgment is also "×"), it is presumed that the number of pieces of fine carbide becomes insufficient, and hydrogen embrittlement resistance is deteriorated.

That of the steel No. 19 is a case the value of ([C]+[Si]/8) exceeds the range specified in the present invention, it is presumed that dissolution of carbide becomes insufficient in quenching, and hydrogen embrittlement resistance is deteriorated although the hydrogen amount judgment is "○". Those of the steel Nos. 20, 21 are cases the C content is excessive (the value of ([C]+[Si]/8) also exceeds the range specified in the present invention), it is presumed that dissolution of carbide becomes insufficient in quenching, and hydrogen embrittlement resistance is deteriorated although the hydrogen amount judgment is "○".

That of the steel No. 22 is a case the Si content is excessive (the value of ([C]+[Si]/8) also exceeds the range specified in the present invention), it is presumed that dissolution of carbide becomes insufficient in quenching, and hydrogen embrittlement resistance is deteriorated although the hydrogen amount judgment is "○". That of the steel No. 23 is a case the value of ([C]+[Si]/8) is less than the range specified in the present invention (the hydrogen amount judgment is also "×"), it is presumed that the number of pieces of fine carbide becomes insufficient, and hydrogen embrittlement resistance is deteriorated.

That of the steel No. 24 is a case the Si content is insufficient (the value of ([C]+[Si]/8) is also less than the range specified in the present invention, the hydrogen amount judgment is also "×"), it is presumed that the number of pieces of carbide becomes insufficient, and hydrogen embrittlement resistance is deteriorated. That of the steel No. 25 is a case the Si content is excessive, it is presumed that dissolution of carbide becomes insufficient in quenching, and hydrogen embrittlement resistance is deteriorated although the hydrogen amount judgment is "○".

That of the steel No. 26 is a case the Si content is insufficient (the hydrogen amount judgment is also "×"), it is presumed that the number of pieces of carbide becomes insufficient, and hydrogen embrittlement resistance is deteriorated. That of the steel No. 28 is a case the Mn content is excessive, and hydrogen embrittlement resistance is deteriorated although the hydrogen amount judgment is "○".

That of the steel No. 29 is a case the P content is excessive, it is presumed that P segregates in the grain boundary and the grain boundary is embrittled, and hydrogen embrittlement resistance is deteriorated although the hydrogen amount judgment is "○". That of the steel No. 30 is a case the S content is excessive, it is presumed that S segregates in the grain boundary and the grain boundary is embrittled, and hydrogen embrittlement resistance is deteriorated although the hydrogen amount judgment is "○".

Those of the steel Nos. 43-56 are cases furnace heating has been executed, the prior austenite grain size number has become small (the grain has been coarsened, and the hydrogen amount judgment is also "×"), and hydrogen embrittlement resistance is deteriorated.

INDUSTRIAL APPLICABILITY

By making the high-strength spring steel wire of the present invention a high-strength spring steel wire with 80 area % or more of tempered martensite and 1,900 MPa or more of the tensile strength, in which a predetermined chemical composition is satisfied, C and Si satisfies the relation of the expression (1) below, prior austenite grain size number is No. 10 or more, and the hydrogen absorption amount is 14.0 ppm or more, even when the adding amount of alloy elements is suppressed, excellent hydrogen embrittlement resistance can be secured.

$$0.73\% \leq [C]+[Si]/8 \leq 0.90\% \tag{1}$$

where [C] and [Si] express the content (mass %) of C and Si respectively.

The invention claimed is:

1. A high-strength spring steel wire with 80 area % or more of tempered martensite and 1,900 MPa or more of tensile strength, wherein:
    the wire consists of:
    C: 0.50-0.70% by mass;
    Si: 1.50-2.3% by mass;
    Mn: 0.3-1.5% by mass;
    P: 0.015% or less by mass, exclusive of 0%;
    S: 0.015% or less by mass, exclusive of 0%;
    Al: 0.001-0.10% by mass;
    Fe; and
    optionally one or more elements selected from the group consisting of (a) to (f):
    (a) at least one element selected from the group consisting of Cu: 0.7% or less by mass, exclusive of 0%, and Ni: 0.7% or less by mass, exclusive of 0%;
    (b) Ti: 0.10% or less by mass, exclusive of 0%;
    (c) B: 0.010% or less by mass, exclusive of 0%;
    (d) at least one element selected from the group consisting of Nb: 0.10% or less by mass, exclusive of 0%, and Mo: 0.5% or less by mass, exclusive of 0%;
    (e) V: 0.4% or less by mass, exclusive of 0%; and
    (f) Cr: 0.5% or less by mass, exclusive of 0%;
    wherein:
    C and Si satisfy expression (1) below,
    a prior austenite grain size number is No. 10 or more, and
    a hydrogen absorption amount is 14.0 ppm or more $$0.73\% \leq [C]+[Si]/8 \leq 0.90\% \tag{1}$$

where [C] and [Si] express the content, in mass %, of C and Si respectively.

2. The high-strength spring steel wire according to claim 1 whose diameter is 7-20 mm.

3. The high-strength spring steel wire according to claim 1, wherein the Cu is present.

4. The high-strength spring steel wire according to claim 1, wherein the Ni is present.

5. The high-strength spring steel wire according to claim 1, wherein the Ti is present.

6. The high-strength spring steel wire according to claim 1, wherein the B is present.

7. The high-strength spring steel wire according to claim 1, wherein the Nb is present.

8. The high-strength spring steel wire according to claim 1, wherein the Mo is present.

9. The high-strength spring steel wire according to claim 1, wherein the V is present.

10. The high-strength spring steel wire according to claim 1, wherein the Cr is present.

11. A high-strength spring obtained using the high-strength spring steel wire according to claim 1.

12. A method for manufacturing the high-strength spring steel wire of claim 1, comprising:
    induction hardening and tempering a wire rod or a steel wire satisfying the chemical composition according to claim 1 under the following conditions:
    a quenching condition comprising:
    a heating temperature T1 for quenching: 850-1,000° C.,
    an average temperature raising rate HR from 100° C. to the heating temperature T1 for quenching: 40° C./s or more, a holding time t1 at the heating temperature T1 for quenching: 90 s or less, and an average cooling rate CR1 from 300° C. to 80° C. after the heating for quenching: 5° C./s or more and 100° C./s or less, a tempering condition comprising:

a heating temperature T2 for tempering: 350-550° C., an average temperature raising rate HR2 from 100° C. to the heating temperature T2 for tempering: 30° C./s or more, a holding time t2 at the heating temperature T2 for tempering: 90 s or less, and an average cooling rate CR2 from the heating temperature T2 for tempering to 100° C. after the heating for tempering: 30° C./s or more.

* * * * *